Patented Aug. 16, 1932

1,871,515

UNITED STATES PATENT OFFICE

ERNEST F. GRETHER, OF MIDLAND, MICHIGAN, ASSIGNOR TO THE DOW CHEMICAL COMPANY, OF MIDLAND, MICHIGAN, A CORPORATION OF MICHIGAN

DYE INTERMEDIATES AND DERIVED AZO DYES

No Drawing.　　　Application filed July 25, 1929.　Serial No. 381,087.

My invention relates to new azo-arylide derivatives of hydroxy-aromatic carboxylic acids, more particularly to such derivatives of 2:3-hydroxynaphthoic acid, and to direct-developed poly-azo-dyes derived therefrom by coupling with suitable diazo-components.

The dye intermediates of my invention belong to the general class of azo-arylides of hydroxy-aromatic carboxylic acids, into which may be coupled suitable diazo-components with the consequent production of the so-called ice-colors or direct-developed dyes. In a pending application, Serial No. 358,756, filed April 27, 1929, I have described new azo-arylides of 2.3-hydroxynaphthoic acid and new azo-dyes derived therefrom, the aforesaid azo-arylides being formed by condensing a mono-amino-azo-compound with said acid in equimolecular proportion. In a later application, Serial No. 374,284, filed June 27, 1929, I have described related azo-arylides, made by condensing one mole of a diamino azo-compound with two moles of the abovementioned acid, and also azo-dyes derived therefrom.

I have now found that complex azo-arylides of related character may be prepared by condensing a conjugated diamino-azo-compound of the general formula, $$NH_2-R-N=N-R'-NH_2,$$

wherein R and R' are aryl residues, with two moles of a hydroxynaphthalene carboxylic acid, e. g. 2.3-hydroxynaphthoic acid. Such conjugated diamino-azo-compounds are composed of two aromatic nuclei joined thru an azo group, each of the aromatic nuclei carrying one or more amino groups. The azo-arylide compounds so-produced constitute new and useful intermediate products from which azo-dyes of excellent fastness to light and washing may be prepared by coupling with suitable diazotized or poly-azotized aromatic amino compounds. The invention, then, consists of the aforesaid new intermediate compounds and azo-dyes derived therefrom, together with methods for the preparation thereof, as hereinafter described and particularly pointed out in the claims, the following description setting forth detailed procedure representative of various ways in which the principle of the invention may be used.

The herein described new intermediate compounds, comprising poly-(hydroxy-naphthoyl) derivatives of diamino aromatic azo-compounds, have the following general formula:—

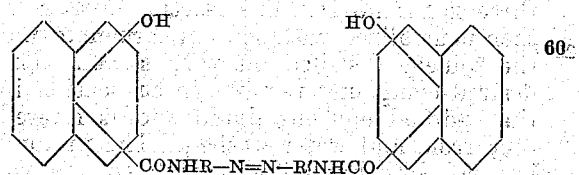
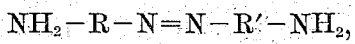

wherein R and R' represent aryl residues which may be either the same or different, and either one or both may be further substituted or not, as desired, by other monovalent groups, such as halogen, nitro, azo groups, etc. The aforesaid groups R and R' may be mono-nuclear, poly-nuclear, condensed-nuclear, or conjugated-nuclear, such as the residues from compounds of the benzene, di-phenyl, naphthalene or di-aryl ether series, respectively. Furthermore, the hydroxy-acid itself may be further substituted, as by halogen, hydrocarbon, or nitro groups.

The new azo-dyes may be prepared by coupling the aforesaid azo-arylides with diazotized or poly-azotized aromatic amino-compounds in the usual way. Said dyes dye cotton directly in a wide range of colors, varying thru orange and red to violet, which are very fast to light and washing. They are advantageously applied by developing on the fiber, but may also be produced in substance or deposited upon the usual substrata to form lakes, in which forms they are useful pigments, or in any other preferred manner.

A preferred mode of procedure for carrying out the invention is illustrated in the following examples, but it is understood that such examples are not to be interpreted as a limitation upon the invention.

Example 1

One mole p-amino-acetanilide is diazotized and coupled with one mole alpha-naphthylamine. The azo-product is hydrolyzed to remove the acetyl group, and then condensed with two moles 2.3-hydroxynaphthoic acid by heating the two compounds dissolved or suspended in toluene, or other suitable medium, with addition of a small amount of phosphorus trichloride, the heating being carried out under reflux for approximately three to five hours. The reaction mixture is then neutralized with sodium carbonate and the toluene distilled off with steam. The desired compound remains in suspension in the residual aqueous liquid and is filtered therefrom and water-washed. The product is purified by dissolving in dilute (one to two percent) caustic alkali solution, filtering from unreacted diamine and reprecipitating by acidification of the alkaline solution. The intermediate compound so produced probably has the formula:—

Cotton material is impregnated with a slightly alkaline solution of the above intermediate compound to which a small amount of formaldehyde may advantageously be added and, if desired, turkey-red oil or other agent to facilitate the absorption of the solution by or on the fiber. The impregnated material is then immersed in a cold solution of sodium acetate or carbonate and the dye developed by adding a diazo solution prepared from two moles alpha-naphthylamine. The color is purple. The dye probable has the formula:—

*Example 2*

In similar manner to Example 1, two moles o-chloro-p-toluidine are diazotized and coupled into the same complex arylide. The resulting dye is scarlet in color and probably has the formula:—

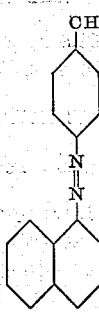

In a similar fashion other dyestuffs have been prepared by coupling other diazotized or tetrazotized amino or poly-amino aromatic compounds with the same or other hydroxy compounds of the type above described. Among the diazo-components employed, may be mentioned: m-nitraniline, p-amino-acetanilide, 4.4'-diamino-diphenyl ether, benzidine and p-nitro-benzene-azo-o-toluidine.

Although in Example 1, cotton fiber is specifically referred to as the material upon which the present dyes may be developed, my new dyes are also capable of dyeing other natural or synthetic fibers, such as wool, silk, rayon, or the like.

The present dyestuffs may be applied upon the fiber or not, as desired; the invention being independent of the particular mode of application employed. Auxiliary treatments for fixing or otherwise aiding the absorption of the dye by or on the fiber may be utilized optionally in conjunction with the dyeing process without departing from the spirit of the invention which concerns not only the new dyes but also materials dyed therewith.

In carrying out the invention for producing the new azo-dyes, the result is, of course, equivalent whether two moles of a diazotized mono-amino aromatic compound or one mole of a tetrazotized diamine is employed as diazo-component for coupling with the herein described intermediate products.

Briefly stated, my invention is concerned with poly-(hydroxy-naphthoyl) azo-arylides and direct-developed azo-dyes prepared therefrom, the latter being characterized by the following grouping:—

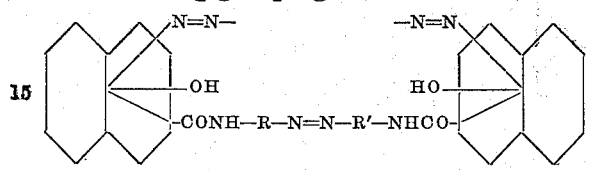

wherein R and R' represent aryl residues, and wherein the several groups and residues may be further substituted.

Other modes of applying the principle of my invention may be employed instead of the one explained, change being made as regards the steps or materials employed, provided the steps or ingredients stated by any of the following claims or the equivalent of such stated steps or ingredients be employed.

I therefore particularly point out and distinctly claim as my invention:—

1. The method of making new azo-compounds which comprises condensing a diamino aromatic azo-compound having the general formula, $NH_2—R—N=N—R'—NH_2$, wherein R and R' represent aryl residues of the benzene and/or naphthalene series which may bear substituents selected from the group consisting of halogen and nitro substituents, with 2.3-hydroxynaphthoic acid in the approximate proportion of one mole of the former to two moles of the latter and in the presence of a condensing agent.

2. The method of making new azo-compounds which comprises condensing a diamino aromatic azo-compound having the general formula:—

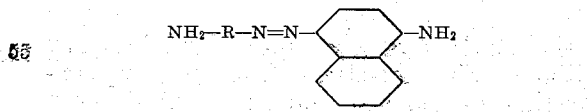

wherein R represents an aryl residue of the benzene or naphthalene series, which residue and naphthalene nucleus may bear substituents selected from the group consisting of halogen and nitro substituents, with 2.3-hydroxynaphthoic acid in the approximate proportion of one mole of the former to two moles of the latter.

3. As a new compound, the condensation-product of a diamino aromatic azo compound with two molecular equivalents of 2.3-hydroxynaphthoic acid, probably having the general formula:—

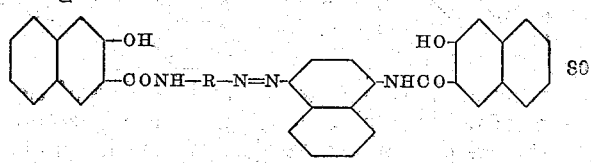

wherein R represents an aryl residue of the benzene and/or naphthalene series, and the several groups and residues may bear substituents selected from the group consisting of halogen and nitro substituents.

4. The method of making new azo-dyes which comprises coupling a poly-(2.3-hydroxynaphthoyl) azo-arylide of the general formula:—

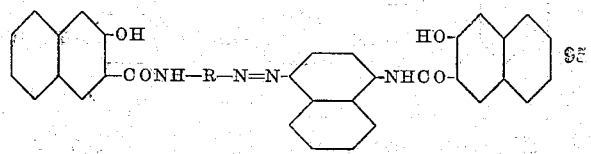

wherein R represents an aryl residue of the benzene or naphthalene series, and the several groups and residues may bear substituents selected from the group consisting of halogen and nitro substituents, with a diazotized aromatic amino compound.

5. As a new compound, an azo dye having the general formula

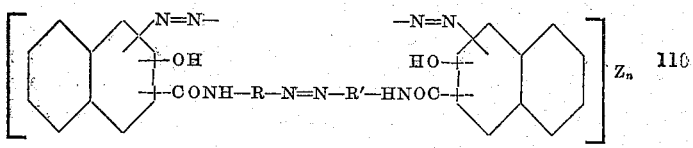

wherein R and R' represent aryl residues of the benzene and/or naphthalene series, Z represents the residue of a diazotized aromatic amino compound, $n$ is the integer 1 or 2, and wherein the several groups and residues may bear substituents selected from the group consisting of halogen and nitro substituents.

6. As a new compound, an azo dye having the general formula

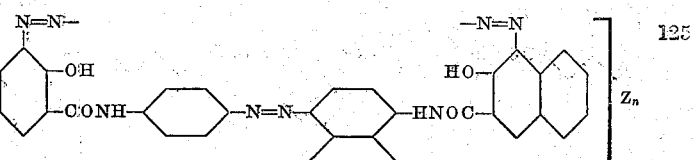

wherein Z represents the residue of a diazotized aromatic amino compound, $n$ is the integer 1 or 2, and wherein the several groups and residues may bear substituents selected from the group consisting of halogen and nitro substituents.

7. As a new compound, an azo dye having the general formula

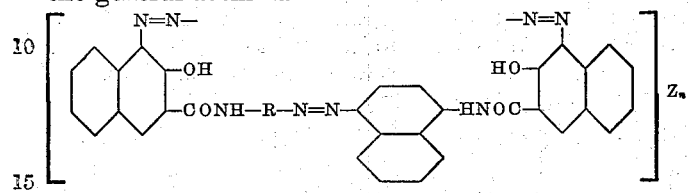

wherein R represents an aryl residue of the benzene or naphthalene series, Z represents the residue of a diazotized aromatic amino compound, $n$ is the integer 1 or 2, and wherein the several groups and residues may bear substituents selected from the group consisting of halogen and nitro substituents.

8. As a new compound, an azo dye having the general formula

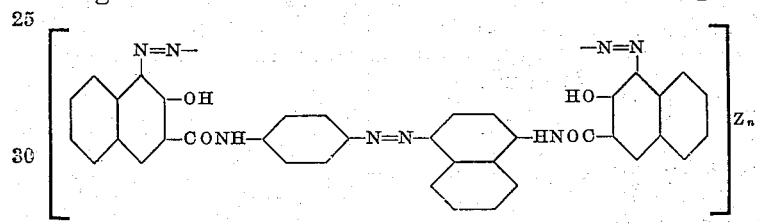

wherein Z represents a residue of a diazotized aromatic amino compound and $n$ is the integer 1 or 2.

9. As a new compound, the condensation-product of a diamino-aromatic azo-compound with two molecular equivalents of 2.3-hydroxynaphthoic acid, said condensation product having probably the formula

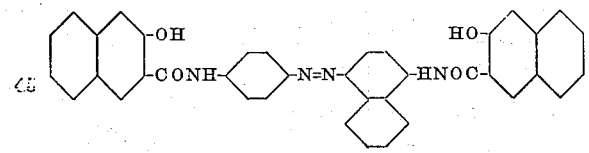

wherein the several groups and residues may bear substituents selected from the group consisting of halogen and nitro substituents.

10. As a new compound, the condensation product of 4.4'-diamino-1.1'-phenyl-azo-naphthalene with two molecular equivalents of 2.3-hydroxynaphthoic acid, said condensation product having probably the formula

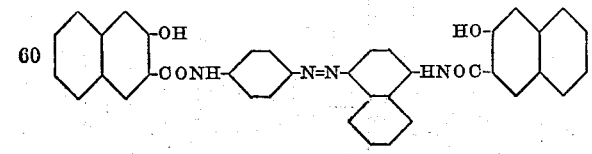

11. The method of making a new azo compound, which comprises condensing a diamino aromatic azo compound having probably the formula

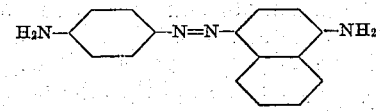

wherein the phenyl and naphthyl residues may bear substituents selected from the group consisting of halogen and nitro substituents, with a hydroxynaphthoic acid in the presence of a condensing agent, thereby forming a compound having the general formula

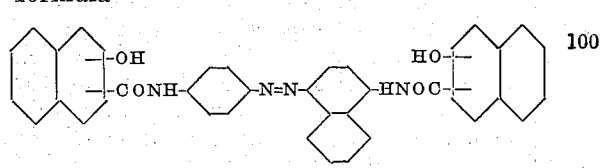

wherein the several groups and residues may bear substituents selected from the group consisting of halogen and nitro substituents.

12. The method of making new azo dyes which comprises coupling a poly-(2.3-hydroxynaphthoyl) azo-arylide having probably the formula

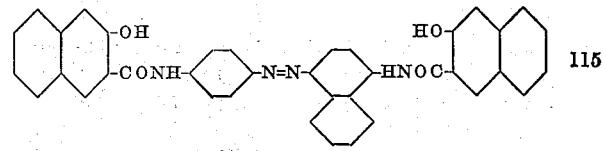

wherein the several groups and residues may bear substituents selected from the group consisting of halogen and nitro substituents, with a diazotized aromatic amino compound.

13. As a new compound, an azo dye having the general formula

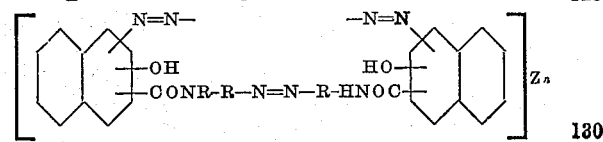

wherein R and R' represent aryl residues of the benzene and/or naphthalene series, which residues may bear substituents selected from the group consisting of halogen and nitro substituents, Z represents the residue of a diazotized aromatic amino compound, and $n$ is the integer 1 or 2.

14. As a new compound, the condensation product of a diamino-aromatic azo-compound with two molecular equivalents of 2.3-hydroxynaphthoic acid, said condensation product having the general formula

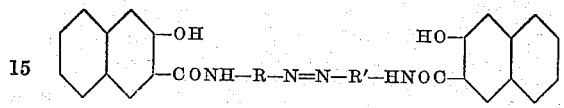

wherein R and R' represent aryl residues of the benzene and/or naphthalene series, which residues may bear substituents selected from the group consisting of halogen and nitro substituents.

Signed by me this 23rd day of July, 1929.

ERNEST F. GRETHER.

Certificate of Correction

Patent No. 1,871,515.  August 16, 1932.

ERNEST F. GRETHER

It is hereby certified that error appears in the printed specification of the above-numbered patent requiring correction as follows: Page 2, line 53, for " probable " read *probably;* page 4, lines 126 to 130, claim 13, strike out the formula and insert instead:

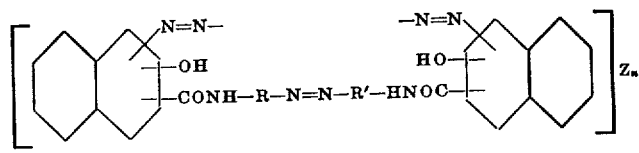

and that the said Letters Patent should be read with these corrections therein that the same may conform to the record of the case in the Patent Office.

Signed and sealed this 25th day of October, A. D. 1932.

[SEAL.]

M. J. MOORE,
*Acting Commissioner of Patents.*